United States Patent [19]

Dysart

[11] Patent Number: 5,027,911
[45] Date of Patent: Jul. 2, 1991

[54] DOUBLE SEAL WITH LUBRICANT GAP BETWEEN SEALS FOR SEALED ROTARY DRILL BITS

[75] Inventor: Theodore R. Dysart, Dallas, Tex.

[73] Assignee: Dresser Industries, Inc., Dallas, Tex.

[21] Appl. No.: 430,343

[22] Filed: Nov. 2, 1989

[51] Int. Cl.⁵ ............................................. E21B 10/22
[52] U.S. Cl. ..................................... 175/57; 175/228; 175/371; 384/93; 384/94
[58] Field of Search ............... 175/371, 372, 228, 227, 175/57; 384/93, 94; 277/59, 74, 17

[56] References Cited

U.S. PATENT DOCUMENTS

| | | | |
|---|---|---|---|
| 3,096,835 | 7/1963 | Neilson | 175/228 |
| 3,251,634 | 5/1966 | Dareing . | |
| 3,739,864 | 6/1973 | Cason, Jr. et al. | 175/372 X |
| 4,073,548 | 2/1978 | Walters | 175/228 X |
| 4,092,054 | 5/1978 | Dye | 175/371 X |
| 4,199,856 | 4/1980 | Farrow et al. | 175/228 X |
| 4,225,144 | 9/1980 | Zitz et al. | 277/12 |
| 4,298,079 | 11/1981 | Norlander et al. | 175/339 |
| 4,453,836 | 6/1984 | Klima | 384/94 |
| 4,552,233 | 11/1985 | Klima | 175/371 |
| 4,593,775 | 6/1986 | Chaney et al. | 175/228 |
| 4,610,319 | 9/1986 | Kalsi | 175/371 |
| 4,942,930 | 7/1990 | Millsapps, Jr. | 175/372 X |

Primary Examiner—Hoang C. Dang

Attorney, Agent, or Firm—Richards, Medlock & Andrews

[57] ABSTRACT

This invention relates to a rotary drill bit having a body with leg members, where each of the leg members has a projecting conical cutter receiving journal. A conical cutter having an axially extending recess open at one end has friction reducing bearings interior to the conical cutter for rotatably mounting the cutter on the journal. A plurality of lubricant carrying conduits interior to the leg members extending into the bearings provides lubricant for the bearings. This invention provides an improved sealing arrangement for preventing an excessive loss of lubricant from the bearings. The conical cutter is adapted with seal receiving grooves at its open end of the recess to receive two seals, with a circumferential seal gap located between the seals. The outer seal is less rigid than the inner seal and when the circumferential seal gap is supplied with lubricant it bleeds past the outer seal to wash away drilling debris. Lubricant can be supplied to the circumferential seal gap by lubricant carrying conduits which carry lubricant from the bearings and/or separate reservoirs, or the inner seal could be a hydrodynamic seal which permits migration of some of the lubricant from the bearings into the circumferential seal gap but prevents contaminates and lubricant from the circumferential seal gap from traveling past the hydrodynamic seal back into the bearings.

12 Claims, 2 Drawing Sheets

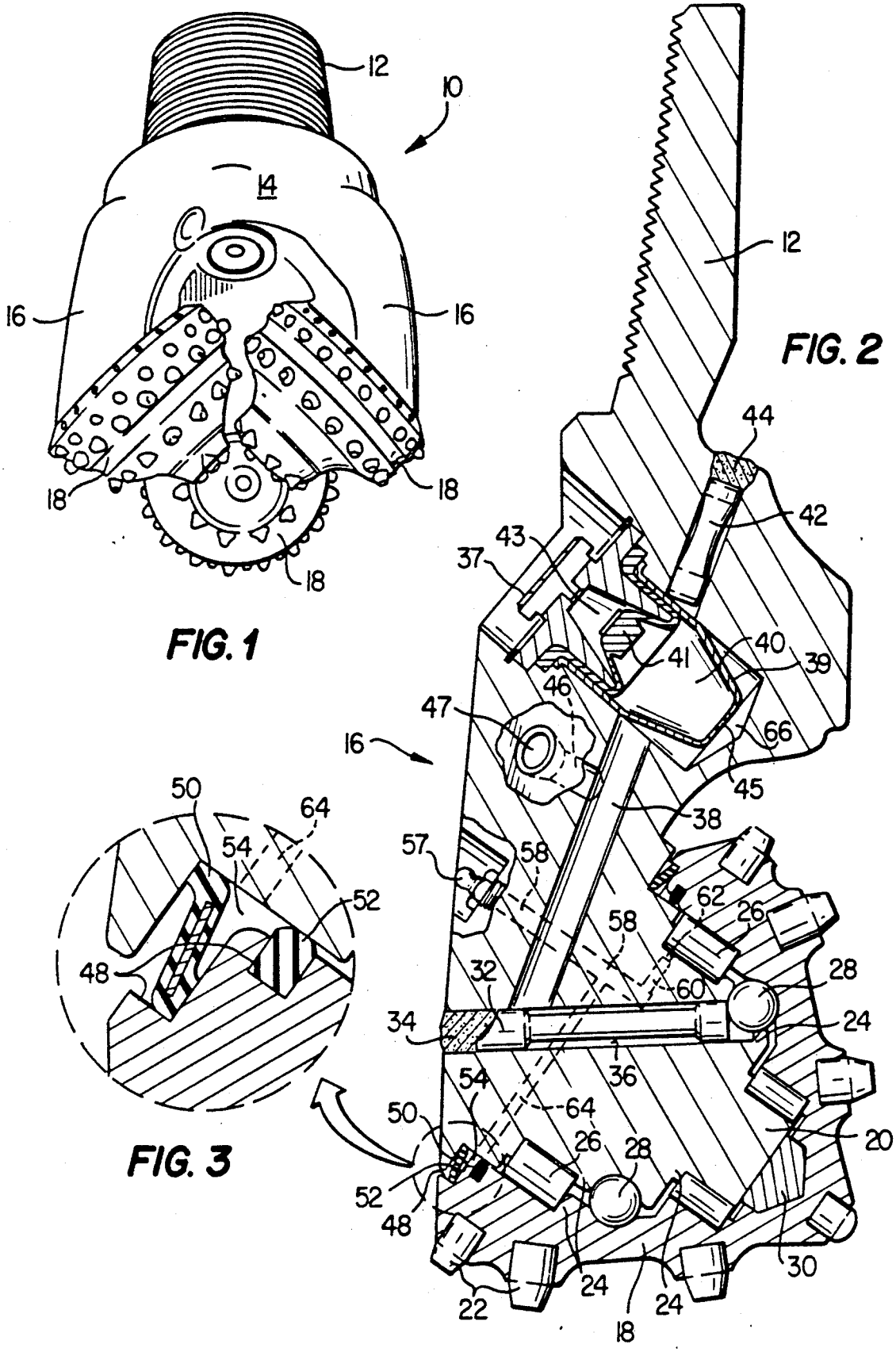

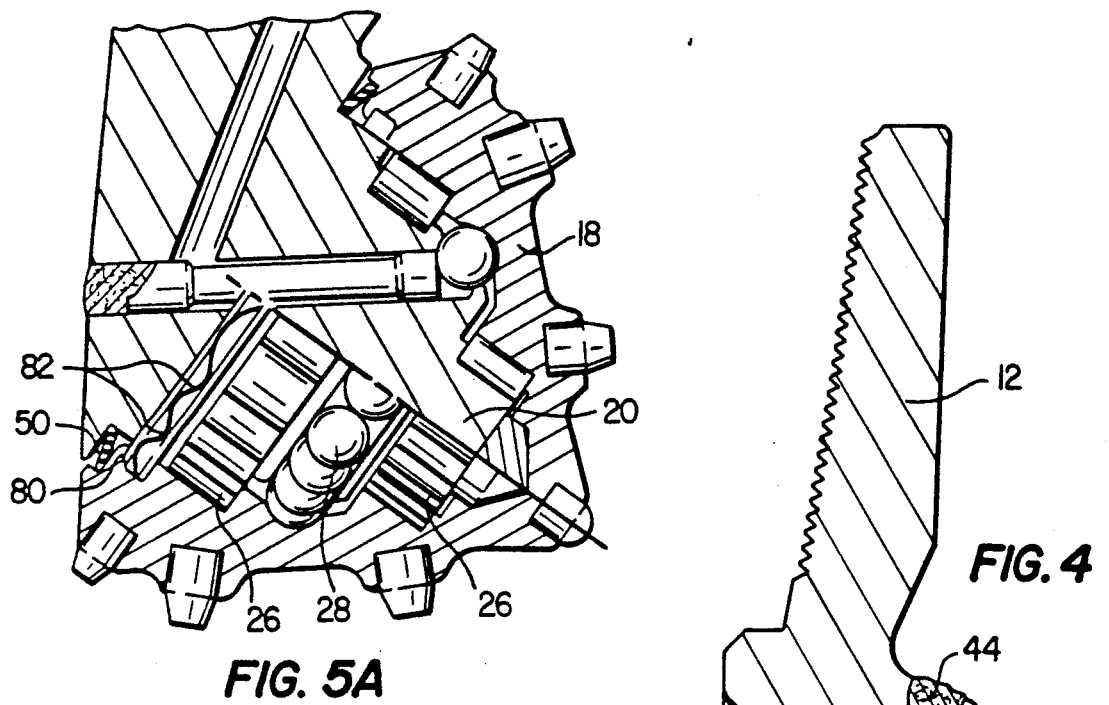
FIG. 5A
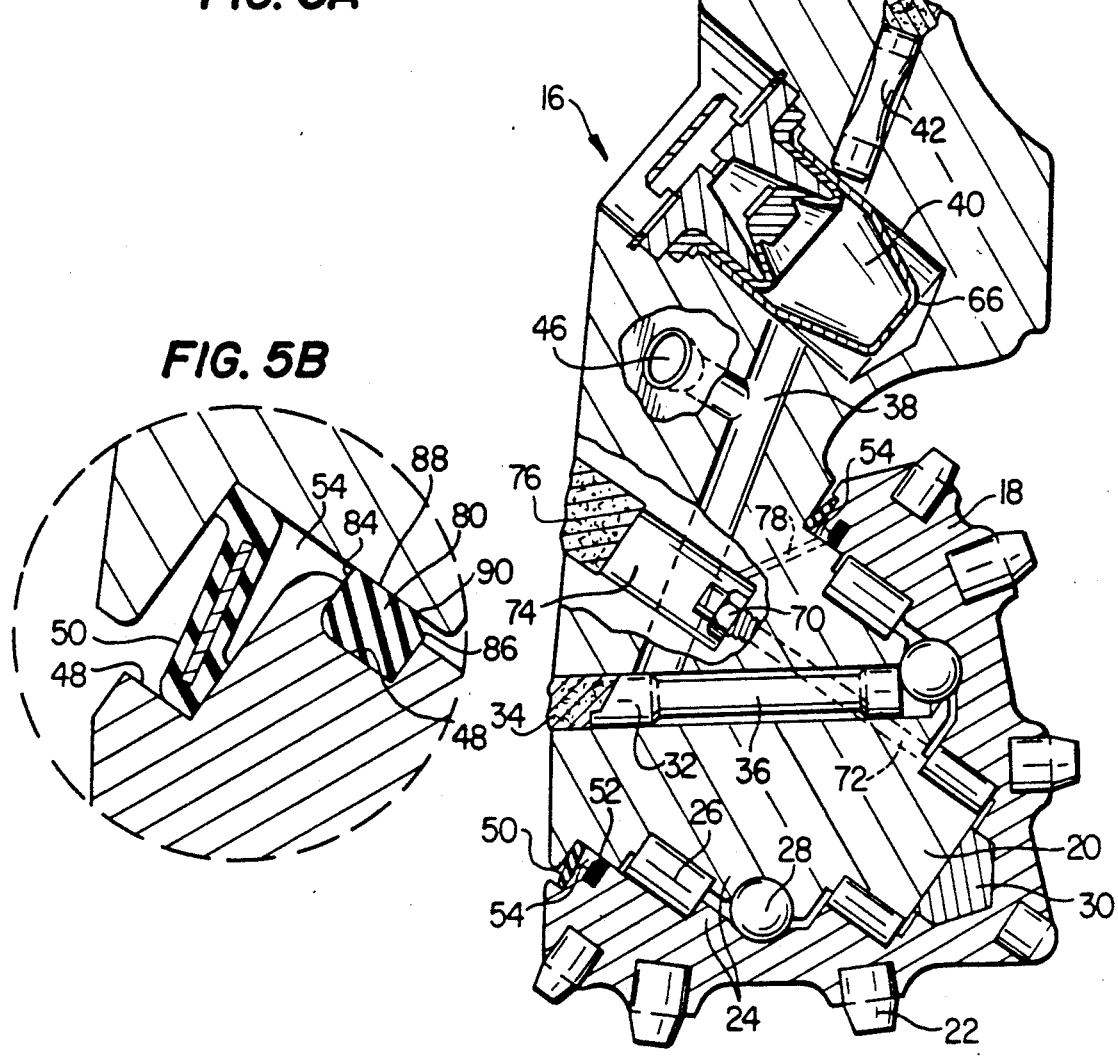
FIG. 5B
FIG. 4

DOUBLE SEAL WITH LUBRICANT GAP BETWEEN SEALS FOR SEALED ROTARY DRILL BITS

TECHNICAL FIELD OF THE INVENTION

This invention relates in general to sealed rotary drill bits used in drilling, and in particular to sealed rotary drill bits having two seals and a circumferential seal gap filled with lubricant located between the seals.

BACKGROUND OF THE INVENTION

Rotary drill bits are typically used in drilling through the earth such as in oil field drilling. The body of a drill bit is attached to a drill pipe by a threaded member on the body of the bit. The drill pipe is supported and rotated by a drilling rig. The body of the rotary drill bit typically has three legs, each of the legs having a projecting, conical cutter-receiving journal. Three conical cutters, each having an axially extended recess open at one end, are rotatably mounted on respective journals through the use of interior friction reducing bearings interior to the conical cutters. Each conical cutter has rock cutting teeth or inserts on the surface of the conical cutter. The conical cutters cut through the rock when the weight of the drill pipe above the drill bit and the rotation of the drill pipe causes the conical cutters to independently rotate about their individual journals and to cut through the rock. In order to reduce interior wear of the rotary drill bit, fluid carrying conduits interior to the leg members and extending to the bearings inside the conical cutters, supply lubrication to the bearings. In order to prevent loss of lubricant, typically each conical cutter will have some sort of sealing means to seal in this lubricant. The sealing means, which is located at the open end of the conical cutter recess, also prevents abrasive materials from entering through any space between the base of the journal and the open end of the conical cutter mounted on this journal, inside the conical cutter to the bearings.

Failure of the seal might result in the bearing lubricant escaping and might result in abrasive material migrating into the bearings. Therefore, various prior art patents have taught sealing techniques for rotary drill bits. For example, U.S. Pat. Nos. 4,453,836 and 4,552,233, both by Klima, disclose sealed rotary drill bits which use more than one seal placed in seal grooves in the journal to prevent escape of lubricant from inside the cones and to provide a barrier to prevent entry of drilling debris. Klima U.S. Pat. No. '836 also discloses the use of a relief valve where when a predetermined pressure is exceeded, lubricant is conducted to the bottom of a seal groove to provide a lubricant function for an outer seal as well as to prevent the application of undue destructive pressure forces to an inner seal. In Klima U.S. Pat. No. '233, as the pressure of lubricant inside the cone increases due to heat, lubricant may exit a port and fill the space between seal rings and the journal. In both Klima patents, lubricant supplied to the seals is continuously lost into the environment. Since neither patent provides an internal reservoir for replenishing lubricant when lubricant is lost, the lubricant must be replenished by refilling the drill bit. Since lubricant is continuously lost, the drill bit must be refilled often, many times after each period of operation.

U.S. Pat. No. 4,225,144 by Zitz et al. discloses a way of sealing the gap between a cutting head and a cutting arm of a drilling machine used in mining. In this patent, an inner cavity is sealed in the outward direction by sealing elements of one type. An additional sealing element of a second type is formed by a lip seal. A pressurized grease conduit opens into space located between the two types of sealing elements and into labyrinth gaps. This grease conduit can be connected to a grease pump or grease press. The resistance of the flow of grease for the lip seal is smaller than the flow resistance for the first type of sealing elements. The sealing lip is arranged in such a direction that the grease emerges in an outward direction via the labyrinth gaps so that any dust particles having entered the sealing gap will be transported in the outward direction.

It is the object of the present invention to provide a sealing arrangement of two seals placed in seal grooves in the conical cutter separated by a circumferential seal gap filled with lubricant supplied from the bearings, where the lubricant has a tendency to flow past an outer seal in the outward direction, and where a separate reservoir holds a large enough supply of lubricant to replenish lubricant to the bearings to replace lubricant lost past the outer seal, so that the drill bit can be operated for long periods of time before requiring refilling. It is another object of this invention to provide the above sealing arrangement where lubricant having a lower penetration value than the bearing lubricant is first supplied to the circumferential seal gap, followed by bearing fluid also supplied to the gap. It is a further object of the present invention to provide for a sealing arrangement where the innermost seal is a hydrodynamic seal which carries lubricant from the bearings into the circumferential seal gap, but prevents migration of lubricant or contaminants from the gap into the bearings.

SUMMARY OF THE INVENTION

This invention provides an improved sealing arrangement of a rotary drill bit. The rotary drill bit has a body with leg members where each of the leg members has a projecting, conical cutter receiving journal. A conical cutter having an axially extending recess open at one end, is rotatably mounted to the journal by the use of friction reducing bearings interior to the conical cutter. A main reservoir supplies fluid to fluid carrying conduits which extend into the bearings.

This invention provides an improved sealing arrangement including an inner seal, an outer seal and a circumferential seal gap located between the seals which is filled with lubricant. The conical cutter is adapted with seal receiving grooves at the open end of the recess to receive the inner and outer seals and to provide the circumferential seal gap between the seals. The inner seal is more resistant to lubricant under pressure than the outer seal and when a means for supplying lubricant to the circumferential seal gap is provided, lubricant in the seal gap will leak past the outer seal, and not the inner seal, so as to wash drilling debris into the environment and away from the outer seal. This arrangement of an outer seal, an inner seal and a circumferential seal gap filled with lubricant located between the seals provides three different types of barriers to drilling debris. The outer seal which bleeds lubricant is designed to wash away drilling debris. The circumferential seal gap filled with lubricant is designed to prevent migration of drilling debris towards the inner seal. The inner seal is designed to prevent drilling debris from getting past it while it holds in the lubricant around the bearings.

In one embodiment of the invention for supplying lubricant to the circumferential seal gap, a separate reservoir, which is preferably filled with a lubricant having a lower penetration value and a higher viscosity than the lubricant used in the bearings, supplies lubricant to conduits which open into the circumferential seal gap. A capillary size hole which opens into the bearings permits lubricant from the bearings to leak into conduits which also lead to the circumferential seal gap and to pressurize the lower penetration value lubricant. While the lower penetration value and higher viscosity lubricant provides the primary protection to the seals, if this supply of lubricant runs low, the lubricant from the bearings backs up the supply of lower penetration value and higher viscosity lubricant and fills the circumferential seal gap.

In another embodiment, a one-way relief valve is connected to one of the bearings. When the lubricant around the bearings naturally expands from the heat of operation of the rotary drill bit, the fluid expands up a conduit past the relief valve into a relief valve reservoir. Once the lubricant is in the relief valve reservoir, it is directed to a conduit directly leading to the circumferential seal gap where it will bleed past the outer seal as described above.

In a third embodiment of the this invention, a separate reservoir for supplying lubricant to a conduit which opens into the circumferential seal gap is not needed. In this embodiment, the inner seal is a hydrodynamic seal. The hydrodynamic seal is designed to permit migration of lubricant from the bearings into the circumferential seal gap while preventing lubricant or contaminates from the circumferential seal gap from traveling past the hydrodynamic seal into the bearing region.

BRIEF DESCRIPTION OF THE DRAWINGS

Further features and advantages will become apparent from the following detailed description of the preferred embodiment of the invention, as illustrated in the accompanying drawings in which like reference characters refer to the same elements or functions throughout the views, and in which:

FIG. 1 is a perspective sketch of a rotary drill bit of the invention;

FIG. 2 is a cross-sectional view of one leg of the drill bit in FIG. 1, illustrating one embodiment of the invention;

FIG. 3 is a cross-sectional view illustrating an enlarged view of the two seals and the circumferential seal gap located between the seals illustrated in the drill bit of FIG. 2;

FIG. 4 is a cross-sectional view of one leg of the drill bit of FIG. 1, illustrating a second embodiment of the invention;

FIG. 5A is a partial cross-sectional view of one leg of the drill bit of FIG. 1, illustrating a third embodiment of the invention; and FIG. 5B is a cross-sectional view of the seals used in the third embodiment of the invention illustrated in FIG. 5A.

DETAILED DESCRIPTION

FIG. 1 illustrates a rotary drill bit of the type to which the invention pertains. Rotary drill bit 10 includes a top threaded portion 12 for threaded connection to a drill pipe (not shown). The body 14 of the rotary drill bit has three legs 16 with conical cutters 18 attached.

FIG. 2 illustrates a partial cross-sectional view of rotary drill bit 10 particularly showing the interior of one of the legs 16 with a conical cutter 18 attached. From FIG. 2, it can be seen that a portion of leg 16, hereinafter referred to as the journal 20, is angled with reference to the vertical axis, which includes the threaded portion 12. Journal 20 receives conical cutter 18. Conical cutter 18 includes several cutting teeth 22 which are the elements which cut through the earth during drilling operations. Races 24, which are grooves, are formed on the interior of conical cutter 18 and the exterior of journal 20 so that when the conical cutter is placed on the journal, these races will accommodate roller bearings 26 and ball bearings 28. A thrust button 30 is placed between journal 20 and conical cutter 18 to reduce stress between the journal and the conical cutter. Roller bearings 26 and ball bearings 28 provide for rotatable engagement between conical cutter 18 and journal 20, and also serve to retain the conical cutter in assembly with the journal. During assembly of the drill bit, ball bearings 28 are fed through a ball plug 32, and when the ball bearings are in place, ball plug 32 is secured by a weld 34. Ball plug 32 also contains a conduit 36 for carrying lubricant to roller bearings 26 and ball bearings 28. FIG. 2 also illustrates a main conduit 38 which is connected into a main reservoir 40 at one end and which is connected into the ball plug conduit 36 at the other end. Main reservoir 40 is comprised of a canister 39, diaphragm 41, and chamber 43 which is open to the environment when a plug 37 is in an open position (as illustrated). A lubricant filler hole 46 plugged with plug 47 is also connected to the main conduit 38.

When the main reservoir is to be filled with lubricant, a vacuum is created inside leg 16 from lubricant filler hole 46. Lubricant is then supplied through lubricant filler hole 46 prior to being plugged with plug 47. This lubricant travels through main conduit 38, to ball plug conduit 36 and to roller and ball bearings 26 and 28. Lubricant also travels up main conduit 38 into region 66 near the bottom of main reservoir 40, into the main reservoir through a hole 45 in the main reservoir. Lubricant fills canister 39 in main reservoir 40 and the diaphragm 41 is stretched back into chamber 43. Diaphragm 41 has a tendency to contract back to its unstretched position and to thereby urge lubricant from canister 39 into region 66. As discussed, a cap 37 to main reservoir 40 is shown in an open position with chamber 43 open to the environment. Thus, when cap 37 is in the open position, diaphragm 41 is also exposed to the environment. Since drill bit 10 often operates in a liquid environment, the pressure of the liquid environment can act on stretched diaphragm 41 so the diaphragm tends to contract and urge lubricant into region 66. Drill bit 10 might also operate in a high air pressure environment, with the air pressure tending to force diaphragm 41 to contract. In any case, diaphragm 41 has a tendency to urge the lubricant into region 66 which leads to main conduit 38, to ball plug conduit 36, and to roller and ball bearings 26 and 28. Therefore, any lubricant lost from the bearings is replenished by lubricant from main reservoir 40.

FIG. 2 also illustrates the sealing arrangement and the means for lubricating a gap between these seals in one embodiment of this invention. Seal grooves 48 are formed into conical cutter 18. Seal grooves 48 accommodate an outer seal 50 and an inner seal 52 in coaxial relationship. A circumferential seal gap 54 is located between outer seal 50 and inner seal 52. A conduit 58 holds seal gap lubricant which is to be provided specifically to the circumferential seal gap 54. A capillary size hole 62 which is connected into the region of roller bearings 26 is connected to a conduit 60. Conduit 60 is also connected to conduit 58. The conduit 58 is also tied to a conduit 64 which directly leads to and opens into circumferential seal gap 54.

When the leg 16 is filled with lubricant, inner seal 52 seals the bearing lubricant into the region around the bearings. The conduit 58 is also filled with a seal gap lubricant and this lubricant gas directed into the conduit 64 which directs the seal gap lubricant into the circumferential seal gap 54. The conduit 58 is provided with a Zerk fitting 57 at the end of the conduit closest to the exterior of leg 16. Zerk fitting 57 is a one-way fitting which only permits seal gap lubricant, supplied from an external source, to travel in the direction into conduit 58. As will be explained in more detail below, conduit 58 is preferably supplied with lower penetration value lubricant than the bearing lubricant placed in main reservoir 40. As will also explained in more detail below, the capillary size hole 62 slowly leaks out bearing lubricant from the bearing region into conduit 60 which directs the bearing lubricant into conduit 58. Seal gap reservoir conduit 58 directs the fluid into the circumferential seal gap conduit 64 leading to circumferential seal gap 54.

FIG. 3 illustrates an enlarged view of seals 50 and 52 and the region around the seals including seal grooves 48, circumferential seal gap 54 and circumferential seal gap conduit 64. Outer seal 50 is of a face seal type such as lip compression seal or a spring compression seal. A spring compression seal called a belleville seal is illustrated in FIGS. 2 and 3. The inner seal 52 is a shaft seal such as an O-ring. An O-ring seal called a 1.4 to 1 O-ring seal is an effective seal. The outer face seal is designed so that when lubricant from conduit 64 directs a sufficient amount of lubricant into the circumferential seal gap 54, the pressure of this lubricant will force the outer seal 50 to open and allow the lubricant to bleed out into the environment. The inner seal 52 or shaft seal is designed to be more resistant to the pressures created by the lubricants and will not open under the pressure of lubricant from the circumferential seal gap 54 or lubricant from the bearings. The inner seal 52 thus prevents the loss of lubricant from the bearings, and prevents lubricant or contaminates from the circumferential seal gap 54 from entering into the bearing region. The bleeding of lubricant past outer seal 50 into the environment is designed to prevent drilling debris from accumulating and damaging the outer seal 50 and especially the inner seal 52. Although inner seal 52 provides a barrier to the entry of drilling debris into the bearing region, the bleeding action past outer seal 50 and the barrier to drilling debris created by the lubricant filled circumferential seal gap 54 provide additional protection to the inner seal. The longer the integrity of the inner seal is protected, the longer the lubricant will stay in the bearing region and extend the life of the drill bit. Unlike prior art patents, a main reservoir 40 is provided with a large enough supply of lubricant specifically for replenishing lubricant to the bearings because of lubricant loss past outer seal 50, such that rotary drill bit 10 can be operated for long periods of time before requiring refilling.

The lubricant for the bearings is made of a mineral oil having a viscosity of between 50 to 200 centistokes at 40° C. (ideally 108 centistokes) mixed with a calcium complex soap base to form a grease. The grease from the bearings should have an ASTM worked penetration in the range of 310 to 400 mm, with an ideal penetration of 350 mm. A seal gap grease having a lower penetration value than the lubricant for the bearings has been found to be most effective at washing away any drilling debris and preventing the drilling debris from entering circumferential seal gap 54. The grease for the circumferential seal gap 54 should have an ASTM worked penetration of 175 to 250 mm, with an ideal penetration somewhere in the middle of this range. The lower penetration value seal gap grease is made up of mineral oil having a viscosity of 500 to 1000 centistokes at 40° C. (ideally 640 centistokes) mixed with a calcium complex soap base. Since conduit 58, the conduit 64 and the circumferential seal gap 54 can be filled with only a limited supply of this lower penetration seal gap value lubricant, means for providing a backup lubricant to the circumferential seal gap is provided as shown in the embodiment in FIG. 2. In this embodiment, the lower penetration seal gap value lubricant first fills the circumferential seal gap 54. During operation of the rotary drill bit, the lower penetration seal gap value lubricant expands and increases in pressure from its initial pressure to a higher operating pressure due to heat and eventually some of the lower penetration value seal gap lubricant bleeds past outer seal 50. At the same time, the higher penetration value bearing lubricant from the bearings also expands and increases in pressure from its initial pressure to a higher operating pressure due to the heat of operation and slowly leaks through the capillary size hole 62 into conduit 60 leading to the conduit 58. The initial pressure of the supply of seal gap lubricant can be less than or equal to the initial pressure of the bearing lubricant in the bearings. The operating pressure of the supply of seal gap lubricant will be greater than initial pressure of the supply of seal gap lubricant and can be greater than the initial pressure of the bearing lubricant in the bearings. Similarly, the operating pressure of the bearing lubricant in the bearings can be greater than or equal to the operating pressure of the supply of seal gap lubricant. When the operating pressure of the supply of seal gap lubricant is higher than the initial pressure of the supply of seal gap lubricant, the rate of passage of seal gap lubricant from its supply into the annular seal gap increases from a first rate at the initial pressure of the supply of seal gap lubricant to a second, higher rate at the operating pressure of the supply of seal gap lubricant. Since the conduit 58 and the conduit 64 are filled first with viscous lubricant, most of the higher penetration value bearing lubricant follows behind the lower penetration value seal gap lubricant. The higher penetration value lubricant pressurizes the lower penetration value lubricant into the circumferential seal gap 54 and past outer seal 50. Some of this higher penetration value lubricant mixes with the lower penetration value lubricant. Furthermore, in the event that all the lower penetration value lubricant is lost, the higher penetration value lubricant will solely fill the circumferential seal gap 54 and eventually bleed past outer seal 50, thereby providing continued protection of the seals.

The separate supply of lower penetration value lubricant can also be eliminated from the embodiment shown in FIG. 2. In this case, conduits 58, 60, and 64 would be initially filled with the bearing lubricant. During operation of the drill bit the capillary size hole 62 would leak additional lubricant from the bearings into conduit 60.

Lubricant would then be directed to circumferential seal gap 54 and bleed past outer seal 50 to wash away drilling debris.

FIG. 4 illustrates another embodiment of the invention. As can be seen in FIG. 4, the drill bit design is essentially the same except for the means of supplying lubricant to the circumferential seal gap 54. A one-way relief valve 70 is connected into the region around the roller bearings 26 by a relief valve conduit 72. While one end of the relief valve 70 is connected to the relief valve conduit 72, the other end of the relief valve opens into a reservoir 74. Relief valve reservoir 74 is welded into place by weld 76. Relief valve reservoir 74 has an opening to which conduit 78, which leads to the circumferential seal gap 54, is tied. Normally in prior drill bits, the main reservoir is underfilled to account for the normal expansion of lubricant during operation of the rotary drill bit. In this embodiment, main reservoir 40 is initially filled to 100% of its capacity. When rotary drill bit 10 of this embodiment is under operation, lubricant from main reservoir 40 is supplied to the bearings as usual. However, as the lubricant expands and increases in pressure due to the normal heating of the rotary drill bit 10 under operation, it travels up relief valve conduit 72 towards relief valve 70. When the expanding lubricant reaches relief valve 70, it travels through the relief valve into relief valve reservoir 74. Since relief valve 70 is a one-way relief valve, lubricant only travels up through relief valve conduit 72 into relief valve reservoir 74 and does not travel back into the conduit 72. Once relief valve reservoir 74 begins to fill with lubricant, this lubricant will then travel to conduit 78 which leads to circumferential seal gap 54. Thus, circumferential seal gap 54 fills with lubricant and this lubricant will bleed past outer seal 50 to protect the seals against drilling debris as explained above with regard to FIGS. 2 and 3.

FIGS. 5A and 5B illustrate another embodiment of this invention. In this embodiment, the inner seal 52 is a hydrodynamic lubricant seal of the type taught in U.S. Pat. No. 4,610,319 issued to Kalsi. To the extent that this patent teaches the design, function and use of a hydrodynamic seal, it is incorporated herein by reference. When a hydrodynamic seal is used as inner seal 52, it permits leakage of lubricant from the bearing region into the circumferential seal gap 54 but does not permit lubricant or contaminates to travel from the circumferential seal gap past the hydrodynamic seal. Since this hydrodynamic seal provides lubricant to the circumferential seal gap, the separate means of supplying lubricant to the circumferential seal gap, in the embodiments illustrated in FIGS. 2 and 4, are not necessary.

In FIGS. 5A and 5B. the hydrodynamic seal is identified as 80. As disclosed in U.S. Pat. No. 4,610,319, a hydrodynamic seal of the type including hydrodynamic seal 80 in FIGS. 5A and 5B, is provided with a different geometry on the side containing the lubricant for bearings 26 and 28, where promotion of hydrodynamic lubrication is intended, than the seal geometry on the circumferential seal gap side where avoidance of any hydrodynamic activity is desirable. Hydrodynamic seal 80 is designed in a generally circular form having a hydrodynamic shape on the side containing lubricant for bearings 26 and 28 which defines a plurality of waves 82. The amplitude and shape of waves 82 is selected to create a desirable amount of hydrodynamic film due to the relative motion at the hydrodynamic seal 80 interface. On the circumferential seal gap 54 side of the hydrodynamic seal 80, the geometry of the seal can take a number of forms which substantially prevent any hydrodynamic activity due to the relative motion between the seal and the conical cutter 18. The geometry of the hydrodynamic seal 80 on the circumferential seal gap 54 side also successfully substantially combats any wedging action of drilling debris particles due to the relative axial movement between the hydrodynamic seal on the lubricant side and the counterface of the conical cutter 18. In its simplest form, hydrodynamic seal 80 contains a series of sinusoidal waves 82 on the lip exposed to the lubricant side and a planar annular cylindrical surface 84 on the circumferential seal gap 54 side. The geometry of the waves 82 on the lubricant side is selected so as to create a film thickness of desirable magnitude but still maintain a leakage rate as low as possible and compatible with the main reservoir 40 volume available.

More specifically, on the circumferential seal gap 54 side, hydrodynamic seal 80 presents a substantially non-converging edge 84 to contaminates such as drilling fluid to prevent the drilling fluid from developing any degree of hydrodynamic lift as relative rotation occurs between the seal and the surface against which it seals. The non-converging shape also prevents any hydrodynamic lifting activity during relative axial motion between the hydrodynamic seal 80 on the lubricant side and the conical cutter 18.

At its lubricant interface, hydrodynamic seal 80 defines a surface forming a plurality of waves 82 which may be in the form of smooth sine waves or waves of differing design. The sealing element on the lubricant side is formed to define an undulating hydrodynamic geometry forming an inclined surface 86, as viewed in the cross section shown in FIG. 5B, that cooperates with the circular metal sealing surface 88 of the journal to form a hydrodynamic entrance zone of greater width toward the lubricant chamber and gradually tapering to a minimal dimension at the point of contact 90. The undulating surface geometry establishes a seal contact width that varies circumferentially depending on the location of the seal cross section being considered. The gradually tapering surface of hydrodynamic seal 80 at its point of contact 90 with the relatively rotatable metal sealing surface 88 of the journal 20 defines a merging radius to prevent or minimize any scraping activity that might interfere with the flow of lubricant film toward the circumferential seal gap 54. As relative rotation occurs between hydrodynamic seal 80 and journal 20 the undulating design of the seal at the lubricant interface surface causes development of hydrodynamic lifting forces at the contact between the seal and the relatively rotating metal sealing surface 88. These forces cause slight lifting of the sealing material of hydrodynamic seal 80 from the metal sealing surface and thus develop a minute pumping activity causing an extremely small but definite quantity of lubricant to migrate under hydrodynamic influence from the lubricant interface of the seal member toward the circumferential seal gap 54. When a sufficient amount of the lubricant migrates into the circumferential seal gap 54, this will force open outer seal 50 and flush away any drilling debris present. Furthermore, the separation caused by the introduction of a hydrodynamic S lubricant film at the seal interface of hydrodynamic seal 80 with the metal sealing surface 88 eliminates direct rubbing contact and the associated wear. It also ensures continuous maintenance of minimal friction between hydrodynamic seal 80 and the metal sealing surface 88 and maintains a low temperature environment to thus ensure enhanced operational life of the seal.

While the foregoing illustrates and disclose the preferred embodiment of the invention with respect to the composition of the rotary drill bit, it is to be understood that many changes can be made to the rotary drill bit design, such as the type of bearings used, the seals used, and the means for directing lubricant to the circumferential seal gap between the seals, and the application of the rotary drill bit as a matter of engineering choices without departing from the spirit and scope of the invention, as defined by the appended claims.

I claim:

1. In a rotary drill bit having a body with a plurality of cutting elements, each of the cutting elements comprising a leg member having a projecting, conical cutter receiving journal, a conical cutter having an axially extending recess open at one end, friction reducing bearings interior to the cutting element for rotatably mounting the conical cutter on the journal in spaced relationship with the journal, and at least one first lubricating fluid carrying conduit interior to the cutting element and extending into the bearings, the improvement comprising:
   (a) each cutting element having an outer seal receiving groove and an inner seal receiving groove at the open end of the respective recess to receive two seals in coaxial relationship, with a circumferential seal gap between the two seals;
   (b) each cutting element having first and second seals, with the first seal being a face seal and being disposed in the outer seal receiving groove of the cutting element, and the second seal being a shaft seal and being disposed in the inner seal receiving groove of the cutting element, each such first seal having less resistance to the flow of lubricating fluid in the direction from the circumferential seal gap to the open end of the conical cutter than the resistance to the flow of lubricating fluid in each such second seal;
   (c) each cutting element having a lubricating fluid carrying conduit in its interior which extends into the circumferential seal gap and directs a second lubricating fluid, which has a lower penetration value than the first lubricating fluid directed into the bearings, into the circumferential seal gap, the second lubricating fluid eventually exiting past the first seal, thereby exiting through the open end of the conical cutter;
   (d) the rotary drill bit having at least one reservoir in its interior and including a diaphragm interior to said reservoir, the diaphragm having a tendency to urge lubricating fluid from the reservoir into the at least one conduit which extends into the bearings; and
   (e) each cutting element having, in its interior, a capillary which leaks the first lubricating fluid from the bearings into the conduit extending into the circumferential seal gap which directs the first lubricating fluid from the bearings into the circumferential seal gap thereby further pressuring the second lubricating fluid into the circumferential seal gap.

2. A rotary drill bit in accordance with claim 1, wherein each face seal is a lip compression seal.

3. A rotary drill bit in accordance with claim 1, wherein each face seal is a spring compression seal.

4. A rotary drill bit in accordance with claim 3, wherein each spring compression seal is a belleville seal.

5. A rotary drill bit in accordance with claim 1, wherein each shaft seal is a ring seal.

6. In a rotary drill bit having a body with a plurality of cutting elements, each of the cutting elements comprising a leg member having a projecting, conical cutter receiving journal, a conical cutter having an axially extending recess open at one end, friction reducing bearings interior to the cutting element for rotatably mounting the conical cutter on the journal in spaced relationship with the journal, and at least one lubricating fluid carrying conduit interior to the cutting element and extending into the bearings, the improvement comprising:
   (a) each cutting element having an outer seal receiving groove and an inner seal receiving groove at the open end of the respective recess to receive two seals in coaxial relationship, with a circumferential seal gap between the two seals; and
   (b) each cutting element having first and second seals, with each first seal being a face seal and being disposed in the outer seal receiving groove of the cutting element, and each second seal being a hydrodynamic seal and being disposed in the inner seal receiving groove of the cutting element, each such first seal having less resistance to the flow of lubricating fluid in the direction from the circumferential seal gap to the open end of the conical cutter than the resistance to the flow of lubricating fluid of each hydrodynamic seal on its circumferential seal gap side, the hydrodynamic seal being designed and positioned such that the side of the hydrodynamic seal facing the circumferential seal gap has a form to prevent lubricating fluid or contaminants from the circumferential seal gap side from getting past it, while the other side of the hydrodynamic seal has a dynamic surface such that when there is lubricating fluid around the bearings the dynamic surface carries some lubricating fluid into the circumferential seal gap, the lubricating fluid carried into the circumferential seal gap eventually exiting past the first seal, thereby exiting through the open end of the conical cutter.

7. A rotary drill bit in accordance with claim 6, wherein each face seal is a lip seal.

8. A rotary drill bit in accordance with claim 6, wherein each face seal is a compression seal.

9. A rotary drill bit in accordance with claim 8, wherein each compression seal is a belleville seal.

10. A rotary drill bit in accordance with claim 6, further comprising at least one reservoir in its interior and including a diaphragm interior to said reservoir, the diaphragm having a tendency to urge lubricating fluid from the reservoir into the at least one conduit which extends into the bearings.

11. A method of lubricating a plurality of circumferential seal gaps, each circumferential seal gap being located between a respective pair, in a plurality of pairs, of first and second annular seals, wherein the two annular seals in a pair are positioned in coaxial relationship with each other, the plurality of pairs of first and second annular seals being in a rotary drill bit having a body with a plurality of cutting elements, and at least one reservoir contained entirely within the rotary drill bit,
   each such cutting element comprising a leg member having a projecting, conical cutter receiving journal, a cutting element having an axially extending recess open at one end, and friction reducing bearings interior to the conical cutter for rotatably mounting the conical cutter on the journal in spaced relationship with the journal, each cutting element having an outer annular seal receiving groove and an inner annular seal receiving groove at the open end of the respective recess to receive two seals in coaxial relationship, with a circumferential seal gap between the two seals, each cutting element having one of said plurality of pairs of first and second annular seals, with the first annular seal being disposed in the outer annular seal receiving groove of the cutting element, and the second annular seal being a shaft seal being disposed in the inner annular seal receiving groove of the cutting element, each such first annular seal having less resistance to the flow of lubricating fluid in the direction from the respective circumferential seal gap to the open end of the respective conical cutter than the resistance to the flow of lubricating fluid in any direction in the respective second annular seal, comprising the steps of:

(a) filling said at least one reservoir to 100% capacity with a first body of bearing lubricating fluid contained entirely within the rotary drill bit at a first pressure, the first body of bearing lubricating fluid being a large enough supply of bearing lubricating fluid to replenish lubricating fluid to the respective bearings to replace lubricating fluid lost from the respective bearings past the respective first annular seal, so that the drill bit can be operated for a long period of time without replenishing the first body of bearing lubricating fluid;

(b) passing bearing lubricating fluid from the first body of lubricating fluid into the respective bearings when the first body of bearing lubricating fluid is at said first pressure;

(c) providing at least one second body of seal gap lubricating fluid contained entirely within the rotary drill bit at a respective second pressure which is less than or equal to said first pressure;

(d) passing seal gap lubricating fluid at the respective second pressure from the respective second body of seal gap lubricating fluid to the respective circumferential seal gap at a first rate;

(e) operating the rotary drill bit for a period of time such that the temperature of the respective second body of seal gap lubricating fluid increases, thereby causing the seal gap lubricating fluid to expand and increase the pressure of the seal gap lubricating fluid to a respective third pressure which is greater than said first or said second pressures, thereby causing said seal gap lubricating fluid to pass into the respective circumferential seal gap at a second rate greater than said first rate;

(f) operating the rotary drill bit for a period of time such that the temperature of the bearing lubricating fluid in the respective bearings increases, thereby causing the respective bearing lubricating fluid to expand and increase the pressure on the bearing lubricating fluid in the respective bearings to a fourth pressure which is greater than or equal to said third pressure; and (g) passing said bearing lubricating fluid at the respective fourth pressure from the respective bearings into the respective circumferential seal gap, thereby further pressuring the seal gap lubricating fluid in the respective circumferential seal gap.

12. In a rotary drill bit having a body with a plurality of cutting elements, each of the cutting elements comprising a leg member having a projecting, conical cutter receiving journal, a conical cutter having an axially extending recess open at one end, friction reducing bearings interior to the cutting element for rotatably mounting the conical cutter on the journal in spaced relationship with the journal, and at least one lubricating fluid carrying conduit interior to the cutting element and extending into the bearings, the improvement comprising:

(a) each cutting element having an outer seal receiving groove and an inner seal receiving groove at the open end of the respective recess to receive two seals in coaxial relationship, with a circumferential seal gap between the two seals; and (b) each cutting element having first and second seals, with each first seal being a face seal and being disposed in the outer seal receiving groove of the cutting element, and each second seal being disposed in the inner seal receiving groove of the cutting element and being designed to cause migration of lubricant from the bearings into the circumferential seal gap while preventing lubricant and contaminants from the circumferential seal gap from traveling past the second seal to the bearings, each such first seal having less resistance to the flow of lubricating fluid in the direction from the circumferential seal gap to the open end of the conical cutter than the resistance to the flow of lubricating fluid of each second seal on its circumferential seal gap side, the lubricating fluid carried into the circumferential seal gap eventually exiting past the first seal, thereby exiting through the open end of the conical cutter.

* * * * *